UNITED STATES PATENT OFFICE.

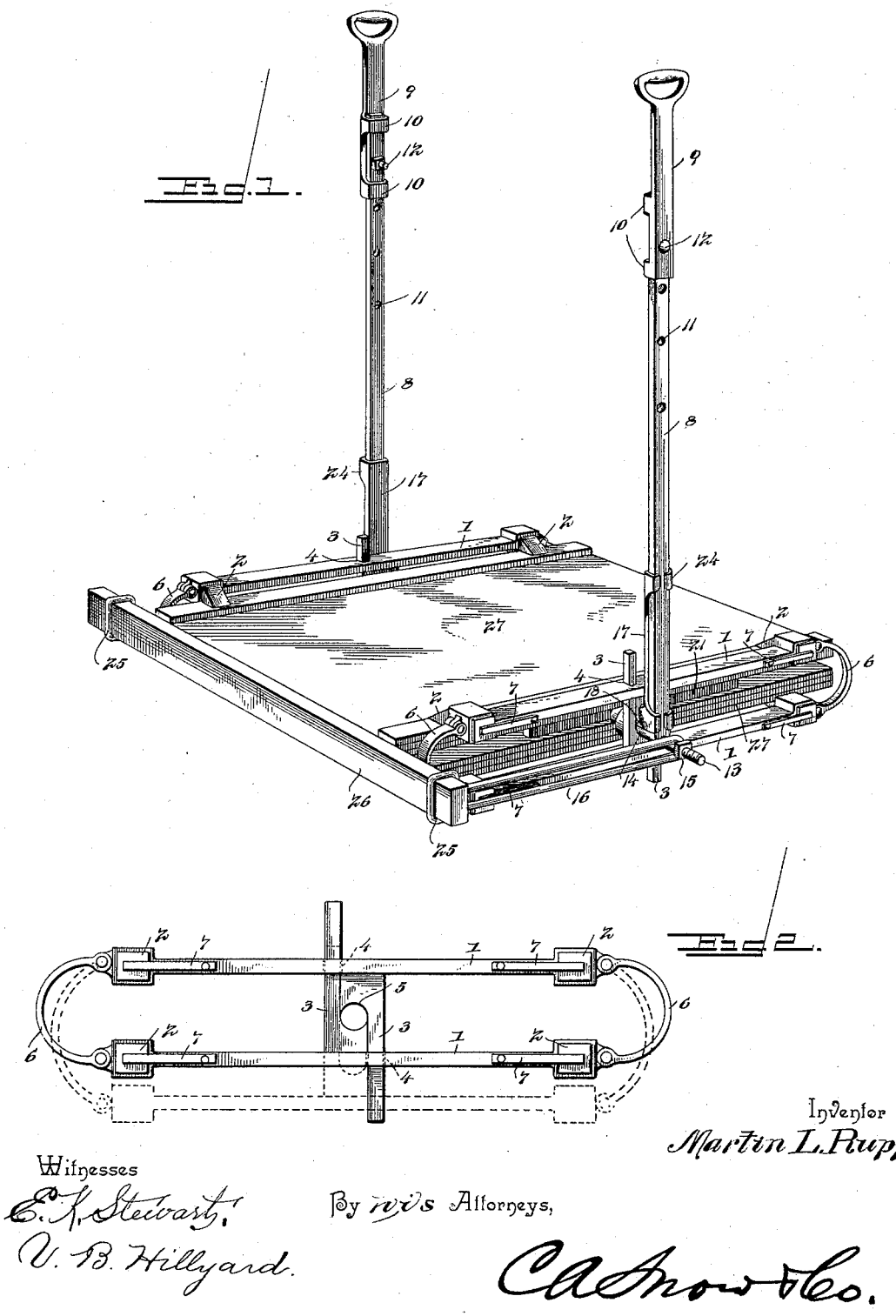

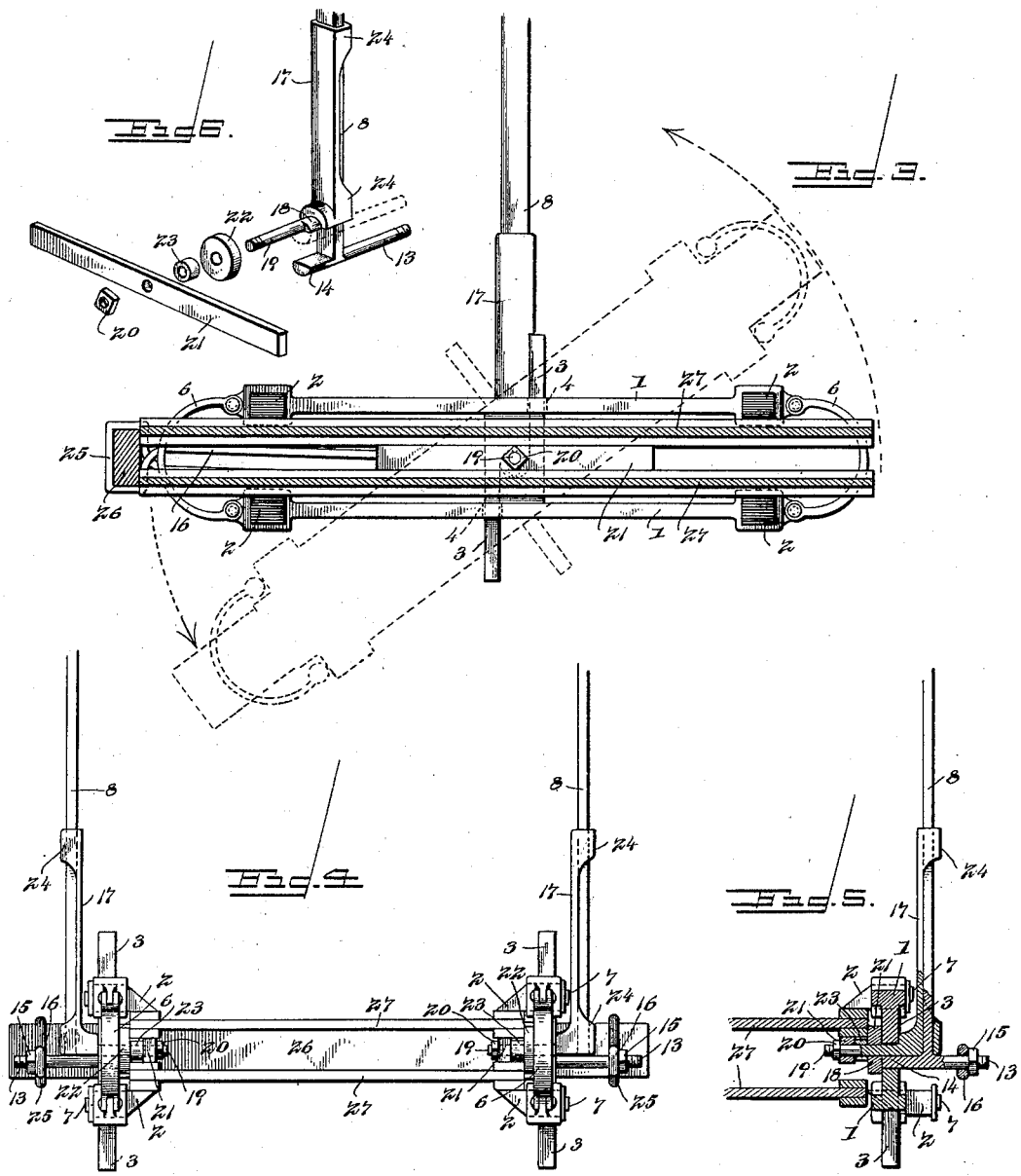

MARTIN L. RUPP, OF FRESNO, CALIFORNIA.

TRAY-TURNER.

SPECIFICATION forming part of Letters Patent No. 613,020, dated October 25, 1898.

Application filed November 6, 1897. Serial No. 657,676. (No model.)

*To all whom it may concern:*

Be it known that I, MARTIN L. RUPP, a citizen of the United States, residing at Fresno, in the county of Fresno and State of California, have invented a new and useful Tray-Turner, of which the following is a specification.

This invention relates to apparatus for turning trays in the art of curing fruit and for like purposes.

When curing fruit, and particularly raisins, the bunches are plucked from the vines and placed upon trays resting upon the ground, and after the fruit has been cured upon one side it is turned so as to expose the other side to the sun, whereby the drying or curing process is completed. As commonly practiced, an empty tray is placed over the tray bearing the fruit cured upon one side, and helpers at the ends of the trays grasp them and reverse their position, whereby the lower tray is brought uppermost and the fruit received upon the tray previously on top and now at the bottom. This operation is laborious and requires the services of two persons. This invention is designed to dispense with one person and lessen the task of the other and enable the work to be performed by a single individual and with greater ease and despatch.

The improvement consists, essentially, of two pairs of gripper-bars for holding an upper and a lower tray, handles having pivotal connection with the gripper-bars to admit of the latter and the trays turning, and a guard to prevent the escape of the fruit when reversing the position of the trays.

The improvement also consists of the novel features and details of construction which hereinafter will be more particularly set forth, illustrated, and finally claimed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the apparatus as it will appear when applied to two trays. Fig. 2 is a detail view in elevation of a pair of gripper-bars, the dotted lines showing the lower gripper-bar depressed. Fig. 3 is a transverse section, the dotted lines showing the trays partly turned. Fig. 4 is a front view of the apparatus applied, the upper portion of the handle-bars being broken away and the guard being on the far side. Fig. 5 is a sectional detail of a pair of gripper-bars and the adjunctive parts, showing the lower bar about in the act of catching the lower tray. Fig. 6 is a detail perspective view of the lower end of a handle-bar and slide, showing the spacer-bar and the parts mounted upon the lateral extension or pin carrying the spacer-bar.

Corresponding and like parts are referred to in the following description and indicated in the several views of the accompanying drawings by the same reference characters.

The apparatus consists of duplicate parts or members which are adapted to grip or be applied to the opposite ends of a pair of trays to be reversed, and in the following description one of these parts or members will be described in detail, which will be sufficient for a full understanding of the invention and the application thereof.

A pair of gripper-bars 1 are provided at their ends with lateral extensions 2, forming catches to engage with and hold the trays. Each gripper-bar is provided on its inner side with a bar 3, which operates in an opening 4, provided in the opposite bar, and this bar 3 is expanded at its inner end, forming a shoulder 5, which is depressed, and the depressed shoulders of the two bars 3 unitedly constitute a bearing which receives the trunnion upon which the gripper-bars and trays turn. The gripper-bars are normally held in a predetermined position by springs 6, applied to their ends and which may be of any desired form, and, as illustrated, these springs are bow-shaped and have pivotal connection at their extremities with lugs provided at the extremities of the bars 1. These springs must be sufficiently stout to cause the lateral extensions or catches 2 to grip the trays firmly and prevent slipping when turning them.

The lateral extensions or catches 2 may be provided in any convenient form so long as they will serve to extend over and grip the trays; but it is preferred to have them yieldingly or slidably connected with the gripper-bars, so that when applying the apparatus to the tray to be reversed the handle-bars can be moved vertically and the catches will yield or move outwardly and ride upon the ends of the lower tray, and after clearing the latter will spring back and engage with the bottom side thereof. These catches are slidably mounted in transverse openings provided at the ends of the gripper-bars and are of such shape as to prevent turning, being preferably of rectangular form, and their active ends are beveled away from their gripping-faces, so as to engage with and ride upon the bottom tray, as clearly indicated in Fig. 5 and as will be readily understood. Springs 7 are made fast at one end to the gripper-bars and their free ends bear upon the outer ends of the catches, so as to hold them projected, and these springs admit of the catches yielding when riding upon the lower tray and force them inward when the catches pass wholly below the tray, so that upon lifting upward upon the handles the trays will be elevated.

The handle-bar 8 is extensible to adapt the apparatus to the height of the operator, the lengthening section 9 being provided with a grip and having loops 10 to receive the upper end of the lower section, which latter is provided with a series of openings 11 to receive a bolt or fastening 12, by means of which the section 9 is held in an adjusted position. The lower end of the handle-bar is formed with a laterally-extending pin 13 at one side and a semicircular lug 14 projecting at right angles from its opposite side, the pin 13 being threaded to receive a nut 15, which serves to hold a slotted arm 16 thereon. A slide 17 is mounted upon the lower portion of the handle-bar 8 and is provided with a semicircular lug 18, corresponding with the semicircular lug 14, the two lugs unitedly forming a trunnion upon which a pair of gripper-bars turn, said trunnion being received in the bearing formed by the depressed shoulders 5. A pin 19 is in line with the semicircular lug 18, and its outer end is threaded to receive a nut 20, and this pin receives a spacer-bar 21, a washer 22, and a collar 23, the washer 22 abutting against the extremities of the lugs 14 and 18 to retain the bars 3 in proper position, and the spacer-bar 21 coming between the collar 23 and the nut 20. The flattened sides or faces of the lugs 14 and 18 are opposite and come together, and the curved faces are outermost and correspond with the curvature of the depressed shoulders 5. The slide 17 is held to the handle-bar in any desired manner, and, as shown, is provided at its ends with pairs of wings 24, which are bent so as to embrace the edge portions of the handle-bar.

The slotted arm 16 is mounted upon the pin 13 and its outer end is formed with an eye 25 to receive a strip 26, which constitutes a guard and extends over the space formed between the superposed trays, so as to retain the fruit in place when turning the trays, as will be readily understood on reference to Fig. 3.

As before intimated, complementary parts constitute the apparatus, each part being manipulated by a hand of the operator when the device is in service. When it is required to turn the trays containing the fruit, an empty tray is placed upon the tray to be turned, and the parts comprising the apparatus are fitted to the ends of the trays substantially in the manner shown in Figs. 1, 3, and 4, the end portions of the trays being caught between the catches of the pairs of gripper-bars. Care should be observed to have the strip or guard 26 touch the edges of the trays facing the operator, so as to retain the fruit in place when reversing the position of the trays. The handle-bars are elevated, so as to admit of the strip or guard 26 clearing the ground when turning the trays, and the latter are reversed by the operator pressing down lightly upon the edge of the trays opposite him, when the trays will turn, as indicated by the dotted lines in Fig. 3. The handle-bars are now lowered until the bottom tray rests upon the ground, after which the upper ends of the handle-bars are brought together, thereby withdrawing the lower set of catches from engagement with the bottom tray, when the apparatus, with the empty tray, can be lifted and placed upon the next tray of the series to be turned. The empty tray is held between the upper set of catches and the spacer-bars 21, and when the apparatus is placed over the next tray the handle-bars are brought about into parallel relation and are lowered, thereby causing the lower set of catches to ride upon the ends of the bottom tray, as indicated in Fig. 5, and when the catches have cleared the lower tray they will spring inward and engage with the bottom side thereof, when the trays are reversed in the manner set forth.

When applying the apparatus, sufficient care should be exercised to have the strip or guard 26 come opposite the space between the trays for the purpose set forth.

The trays 27 are of ordinary construction and form no part of the present invention and must be of like size in order to have the apparatus operate successfully.

Having thus described the invention, what is claimed as new is—

1. In a tray-turner, the combination of a pair of gripper-bars, and a handle-bar having the gripper-bars journaled thereto, substantially as and for the purpose set forth.

2. In a tray-turner, the combination of a pair of gripper-bars movably related, springs for holding the gripper-bars in a normal position, and a handle-bar having the gripper-bars journaled thereto, substantially as set forth.

3. In a tray-turner, the combination of a pair of gripper-bars, a handle-bar, a slide mounted upon the handle-bar, and a bearing between the pair of gripper-bars and the slide and handle-bar and comprising separable parts divided between and carried by the gripper-bars, the slide, and the handle-bar, substantially as set forth.

4. In a tray-turner, the combination of a pair of gripper-bars, oppositely-extending bars carried by the gripper-bars and formed with shoulders which unitedly constitute a bearing, a handle-bar having a laterally-extending lug, and a slide mounted upon the handle-bar and having a corresponding lug, the two lugs forming a trunnion which is mounted in the aforedescribed bearing, substantially as and for the purpose set forth.

5. In a tray-turner, the combination of a pair of gripper-bars, inwardly-extending bars applied to the gripper-bars and adapted to work in openings formed in the respective opposing gripper-bars, and provided with depressed shoulders which unitedly form a bearing, a handle-bar having a lateral lug, and a slide mounted upon the handle-bar and having a corresponding lug, the two lugs forming a trunnion which is mounted in the aforementioned bearing, substantially as and for the purpose set forth.

6. In a tray-turner, the combination of a pair of gripper-bars, a handle-bar having the gripper-bars journaled thereto, and a spacer-bar carried by the handle-bar and located intermediate of the gripper-bars to coöperate with each, substantially in the manner and for the purpose set forth.

7. In a tray-turner, the combination of a pair of gripper-bars, a handle-bar formed with a trunnion upon which the gripper-bars are mounted to turn, and having a pin projecting from the trunnion, and a spacer-bar located intermediate of the gripper-bars and held upon the said pin, substantially as set forth.

8. In a tray-turner, the combination of a pair of gripper-bars, a handle-bar having a lateral lug, a slide mounted upon the handle-bar and formed with a corresponding lug which with the lug of the handle-bar forms a trunnion upon which the gripper-bars are mounted to turn, a pin extending from the lug of the slide, and a spacer-bar mounted upon the said pin and adapted to coöperate with each gripper-bar, substantially in the manner set forth.

9. In a tray-turner, the combination of a pair of gripper-bars to receive between them the trays to be turned, a handle-bar having the gripper-bars journaled thereto, and a grip adjustably connected with the upper end of the handle-bar to admit of the latter being lengthened or shortened, substantially as set forth.

10. In a tray-turner, the combination with a handle-bar, and gripper-bars journaled thereto, of a guard having connection with the handle-bar and adapted to close the space between superposed trays, substantially as and for the purpose set forth.

11. In a tray-turner, the combination with a pair of gripper-bars, and a handle-bar having the gripper-bars journaled thereto, of an arm carried by the handle-bar to turn with reference thereto, and a strip or guard attached to the outer end of the arm and adapted to close the space between superposed trays, substantially as set forth.

12. In a tray-turner, the combination with a pair of gripper-bars, and a handle-bar having the gripper-bars journaled thereto and provided with a laterally-extending pin, of an arm mounted upon the pin so as to turn with reference to the handle-bar, and a strip or guard applied to the arm and adapted to close the space formed between superposed trays, substantially as and for the purpose set forth.

13. In a tray-turner, the combination with a pair of gripper-bars journaled to an operating-handle, of catches yieldingly connected with the gripper-bars and adapted to ride upon the trays and engage automatically therewith after clearing them, substantially in the manner and for the purpose specified.

14. In a tray-turner, the combination with gripper-bars journaled to an operating-handle, of spring-actuated catches slidably mounted with respect to the gripper-bars and having their outer faces beveled to ride upon the trays, substantially as set forth.

15. In a tray-turner, the combination with a pair of gripper-bars journaled to an operating-handle and having openings formed transversely with reference thereto, of catches slidably mounted in the said openings and having their outer ends beveled to ride upon the trays, and springs for normally holding the catches projected, substantially as set forth.

In testimony that I claim the foregoing as my own I have hereto affixed my signature in the presence of two witnesses.

MARTIN L. RUPP.

Witnesses:
JAS. O. LORD,
S. F. GREELEY.